(12) United States Patent
Wu et al.

(10) Patent No.: US 8,723,857 B2
(45) Date of Patent: May 13, 2014

(54) CHARGE PUMP CIRCUITS AND APPARATUSES HAVING THE SAME

(75) Inventors: Zhongyuan Wu, Suwon-si (KR); Yoon Kyung Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1057 days.

(21) Appl. No.: 12/662,479

(22) Filed: Apr. 20, 2010

(65) Prior Publication Data
US 2011/0164026 A1 Jul. 7, 2011

(30) Foreign Application Priority Data

Jan. 5, 2010 (KR) .................. 10-2010-0000507

(51) Int. Cl.
*G06F 3/038* (2013.01)
(52) U.S. Cl.
USPC ............. 345/214; 327/108; 327/536; 363/60
(58) Field of Classification Search
USPC .............. 345/204, 214; 327/108, 536; 363/60
See application file for complete search history.

(56) References Cited

U.S. PATENT DOCUMENTS

| | | | |
|---|---|---|---|
| 6,965,263 B2 | 11/2005 | Bringivijayaraghavan | |
| 7,215,179 B2 * | 5/2007 | Yamazoe et al. | 327/537 |
| 7,224,206 B2 | 5/2007 | Pappalardo et al. | |

FOREIGN PATENT DOCUMENTS

KR 2001-0009333 2/2001

* cited by examiner

*Primary Examiner* — Yong H Sim
(74) *Attorney, Agent, or Firm* — Harness, Dickey & Pierce, P.L.C.

(57) ABSTRACT

A charge pump circuit configured to prevent latch-up is provided. The charge pump circuit includes a first transistor including a first bulk terminal, a first input terminal and a first output terminal, a first switching circuit connecting the first bulk terminal to one of the first input terminal and the first output terminal according to a voltage of the first input terminal and a voltage of the first output terminal, a first capacitor having a terminal connected to the first output terminal, and a second switching circuit connecting a second terminal of the first capacitor to the first input terminal or a ground in response to a plurality of clock signals.

11 Claims, 7 Drawing Sheets

CHARGE PUMP CIRCUITS AND APPARATUSES HAVING THE SAME

CROSS-REFERENCE TO RELATED APPLICATIONS

This application claims priority under 35 U.S.C. §119 to Korean Patent Application No. 10-2010-0000507, filed on Jan. 5, 2010, in the Korean Intellectual Property Office, the entire contents of which are incorporated herein by reference.

BACKGROUND

Example embodiments of inventive concepts relate to semiconductor devices, and more particularly, to a charge pump circuit capable of preventing latch-up and apparatuses having the charge pump circuit.

To prevent a drop of a threshold voltage at an output stage of an output circuit, a transistor for transmitting a voltage having a high level is embodied as a PMOS. A bulk of a PMOS transistor used in a charge pump circuit is generally connected to an output stage. However, at a beginning of booting the charge pump circuit, a voltage of an output terminal of the charge pump circuit is lower than a voltage of an internal terminal or an input voltage, so that a diode formed between a p+ diffusion region and an n-well region may be forward-biased. Such a situation may cause latch-up and accordingly the charge pump circuit may not perform a normal operation.

SUMMARY

Inventive concepts provide a charge pump circuit for preventing latch-up, a driver including the charge pump circuit and a display device including the driver.

An example embodiment is directed to a charge pump circuit, including a first transistor including a first bulk terminal, a first input terminal and a first output terminal, a first switching circuit configured to connect the first bulk terminal to one of the first input terminal and the first output terminal based on a voltage of the first input terminal and a voltage of the first output terminal, a first capacitor having a first terminal connected to the first output terminal, and a second switching circuit configured to connect a second terminal of the first capacitor to the first input terminal or a ground in response to a plurality of clock signals.

The first switching circuit includes a first control signal generator configured to (1) output a first control signal having a low level voltage and a second control signal having the voltage of the first input terminal if the voltage of the first input terminal is higher than the voltage of the first output terminal, and (2) output the first control signal having the voltage of the first output terminal and the second control signal having the low level voltage if the voltage of the first output terminal is higher than the voltage of the first input terminal, a first switching transistor configured to connect the first input terminal and the first bulk terminal in response to the first control signal, and a second switching transistor configured to connect the first output terminal and the first bulk terminal in response to the second control signal. A first bulk of the first switching transistor and a second bulk of the second switching transistor are connected to the first bulk terminal.

The first control signal generator is configured to outputs the first control signal and the second control signal, which have a first middle level voltage if the voltage of the first input terminal and the voltage of the first output terminal are the same.

Another example embodiment is directed to a charge pump circuit, further including a second transistor including a second bulk terminal, a second input terminal connected to the first output terminal and a second output terminal configured to output an output voltage, a third switching circuit configured to connect the second bulk terminal to one of the second input terminal and the second output terminal based on a voltage of the second input terminal and a voltage of the second output terminal, and a second capacitor connected between the second output terminal and the ground.

The third switching circuit includes a second control signal generator configured to (1) output a third control signal having a low level voltage and a fourth control signal having the voltage of the second input terminal if the voltage of the second input terminal is higher than the voltage of the second output terminal and (2) output the third control signal having the voltage of the second output terminal and the fourth control signal having the low level voltage if the voltage of the second output terminal is higher than the voltage of the second input terminal, a third switching transistor configured to connect the second input terminal and the second bulk terminal in response to the third control signal, and a fourth switching transistor configured to connect the second output terminal and the second bulk terminal in response to the fourth control signal. A third bulk of the third switching transistor and a fourth bulk of the fourth switching transistor are connected to the second bulk terminal.

The second control signal generator is configured to outputs the third control signal and the fourth control signal, which have a second middle level voltage if the voltage of the second input terminal and the voltage of the second output terminal are the same.

Another example embodiment is directed to a driver, including the charge pump circuit and a gate line driver configured to output an output voltage output from the charge pump circuit to a gate line.

Another example embodiment is directed to a display device, including a panel including a plurality of gate lines a driver for driving one of the plurality of gate lines, and the charge pump circuit coupled to the driver

BRIEF DESCRIPTION OF THE DRAWINGS

These and/or other aspects and advantages of inventive concepts will become apparent and more readily appreciated from the following description of example embodiments, taken in conjunction with the accompanying drawings of which.

DETAILED DESCRIPTION OF EXAMPLE EMBODIMENTS

Figure 1:
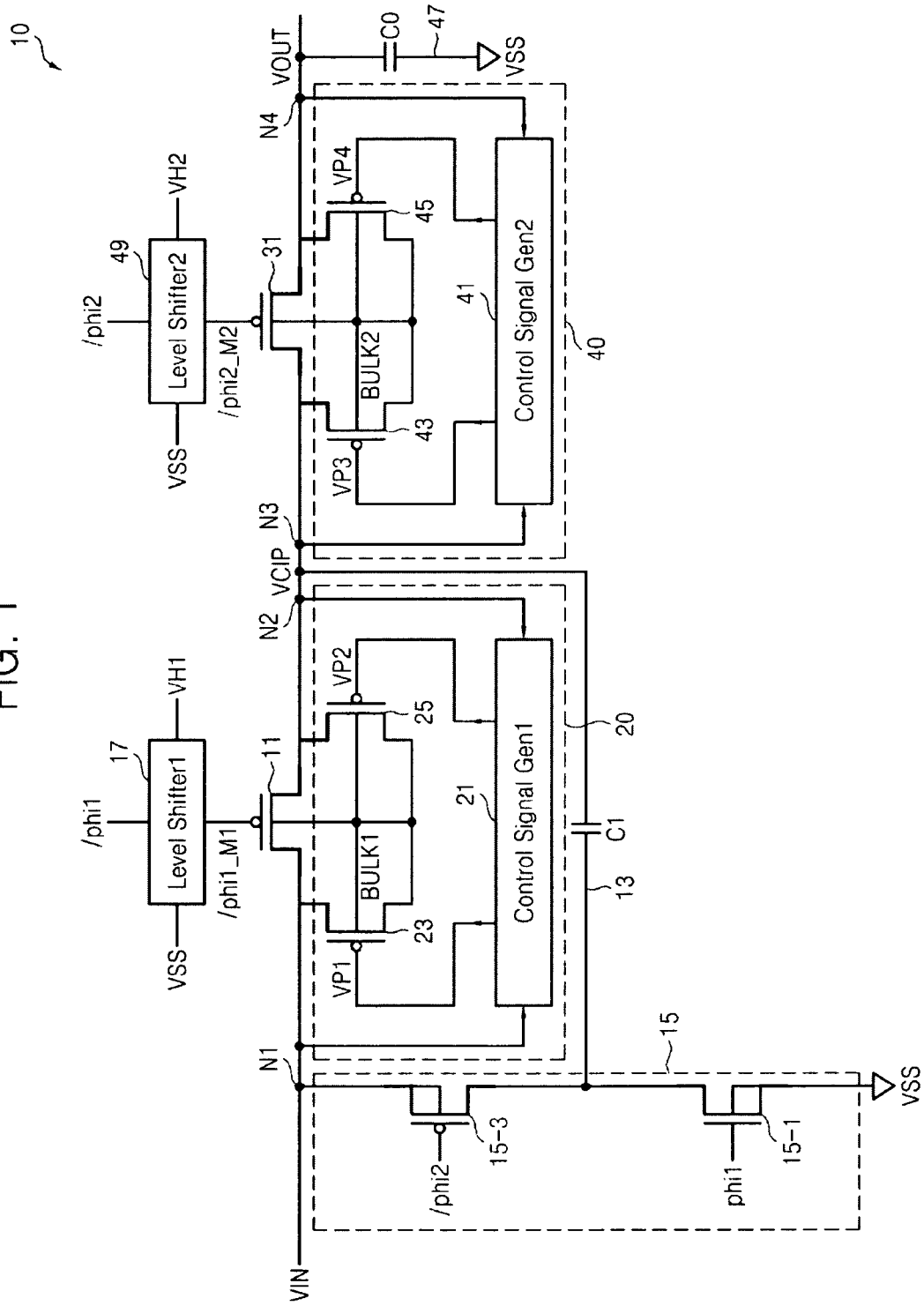
FIG. 1 shows a circuit diagram of a charge pump circuit according to an example embodiment.

Various example embodiments will be described more fully hereinafter with reference to the accompanying drawings, in which some example embodiments are shown. Inventive concepts may, however, be embodied in many different forms and should not be construed as limited to the example embodiments set forth herein. Rather, example embodiments are provided so that this disclosure will be thorough and complete, and will fully convey the scope of inventive concepts to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 shows a circuit diagram of a charge pump circuit according to an example embodiment.

Referring to FIG. 1, a charge pump circuit 10 includes a first transmission circuit, e.g., a first transistor 11, a first capacitor 13, a first switching circuit 20, a second switching circuit 15, and a second transmission circuit, e.g., a second transistor 31, a third switching circuit 40, and a second capacitor 47.

The charge pump circuit 10 boosts an input voltage VIN by performing a charging phase (or a charging operation) and a discharging phase (or a discharging operation) repetitively in response to a plurality of clock signals Phi1 and Phi2 and outputs a boosted voltage VCIP to a second output terminal N4.

A first transistor 11 includes a first bulk terminal or a bulk electrode BULK1, a first input terminal N1 and a first output terminal N2. A first level shifter 17 outputs a first level shift signal /phi1_M1 in response to an inverted first clock signal /phi1 to improve a switching operation of the transistor 11. A level of the first level shift signal /phi1_M1 has a range between a ground voltage VSS and a first voltage VH1. The first voltage VH1 is higher than the ground voltage VSS. As should be understood, a bulk terminal is a terminal that is connected to a bulk of a substrate of a semiconductor device, such as a transistor.

The first transistor 11 is turned on to charge a first capacitor 13 in response to the first level shift signal /phi1_M1 and turned off to discharge the first capacitor 13. According to an embodiment, the first transistor 11 may be embodied as a PMOS transistor.

The first switching circuit 20 connects the first bulk terminal BULK1 to one of the first input terminal N1 and the first output terminal N2 according to the voltage VIN of the first input terminal N1 and the voltage VCIP of the first output terminal N2. The first switching circuit 20 includes a first control signal generator 21, a first switching transistor 23 and a second switching transistor 25.

Figure 2:
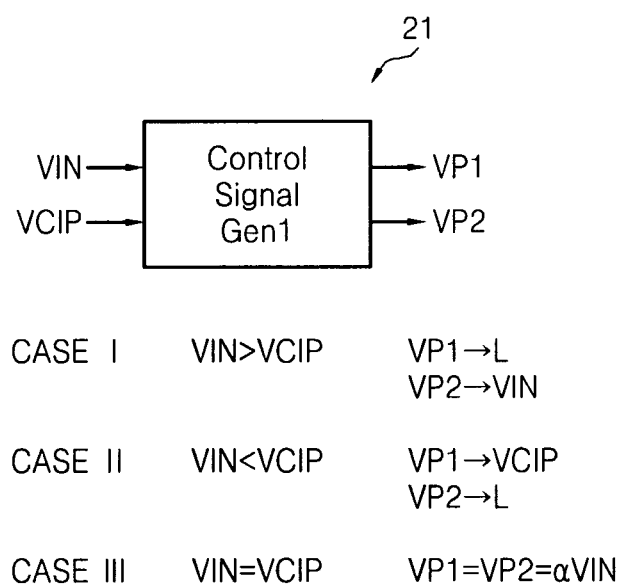
FIG. 2 shows a block diagram for explaining an operation of a first control signal generator illustrated in FIG. 1.

FIG. 2 shows a block diagram for explaining an operation of a first control signal generator illustrated in FIG. 1. Referring to FIGS. 1 and 2, the first control signal generator 21 outputs a first control signal VP1 having a low level and a second control signal VP2 having a voltage VIN of a first input terminal N1 when a voltage VIN of the first input terminal N1 is higher than a voltage VCIP of the first output terminal N2 (CASE I).

The first switching transistor 23 controls a connection between the first input terminal N1 and the first bulk terminal BULK1 in response to a first control signal VP1, and the second switching transistor 25 controls a connection between the first output terminal N2 and the first bulk terminal BULK1 in response to a second control signal VP2. According to an example embodiment, the first switching transistor 23 and the second switching transistor 25 may be embodied as a PMOS transistor. Accordingly, when the first control signal VP1 is a low level, the first switching transistor 23 is turned on and connects the first input terminal N1 and the first bulk terminal BULK1.

When the second control signal VP2 is a voltage VIN of the first input terminal N1, the second switching transistor 25 is turned-off, so that the first output terminal N2 and the first bulk terminal BULK1 are not connected each other. The first control signal generator 21 outputs a first control signal VP1 having a voltage VCIP of the first output terminal N1 and a second control signal VP2 having a low level when a voltage VCIP of the first output terminal N2 is higher than a voltage VIN of the first input terminal N1 (CASE II).

Accordingly, when the first control signal VP1 is a voltage VCIP of the first output terminal N1, the first switching transistor 23 is turned-off, so that the first input terminal N1 and the first bulk terminal BULK1 are not connected each other. When the second control signal VP2 is a low level, the second switching transistor 25 is turned-on, so that the first output terminal N2 and the first bulk terminal BULK1 are connected each other.

The first control signal generator 21 outputs the first control signal VP1 and the second control signal VP2, which have a voltage αVIN having a first middle level respectively, when a voltage VCIP of the first output terminal N2 is the same as a voltage VIN of the first input terminal N1. Here, a may be smaller than 1.

When the first control signal is a voltage αVIN having a first middle level, the voltage αVIN having a first middle level may turn on the first switching transistor 23, so that the first input terminal N1 and the first bulk terminal BULK1 are connected each other. On the other hand, when the second control signal VP2 is a voltage αVIN having a first middle level, the voltage αVIN having the first middle level may turn on the second switching transistor 25, so that the first input terminal N2 and the first bulk terminal BULK1 may be connected each other. Therefore, when the first control signal VP1 and the second control signal VP2 have a first middle level, respectively, the first switching transistor 23 and the second switching transistor 25 may be respectively turn on, so that the first bulk terminal BULK1 is not floated but connected to the first input terminal N1 and the first output terminal N2.

The first capacitor 13 is charged or discharged according to the first transistor 11 or the second switching circuit 15. The second switching circuit 15 is a switching circuit for charging or discharging the first capacitor 13. The second switching circuit includes a fifth switching transistor 15-1 and a sixth switching transistor 15-3.

The fifth switching transistor 15-1 may be switched in response to the first clock signal phi1 and the sixth switching transistor 15-3 may be switched in response to the inverted second clock signal /phi2. According to an example embodiment, the fifth switching transistor 15-1 may be embodied as a NMOS transistor and the sixth switching transistor 15-3 may be embodied as a PMOS transistor.

A second level shifter 49 outputs a second level shift signal /phi2_M2 in response to the inverted second clock signal /phi2 to improve a switching operation of the second transistor 31. A level of the second level shift signal /phi2_M2 has a range between a ground voltage VSS and a second voltage VH2. The second voltage VH2 is higher than the ground voltage VSS.

The second transistor 31 is turned on or off to transmit a voltage charged in a second input terminal N3(=N2) to a second output terminal N4 in response to the second level shift signal /phi2_M2. According to an example embodiment, the second transistor 31 may be embodied as a PMOS transistor. The third switching circuit 40 connects a second bulk terminal BULK2 to one of the second input terminal N3 and the second output terminal N4 according to the voltage VCIP of the second input terminal N3 and a voltage VOUT of the second output voltage N4. The third switching circuit 40 includes a second control signal generator 41, a third switching transistor 43 and a fourth switching transistor 45.

Figure 3:
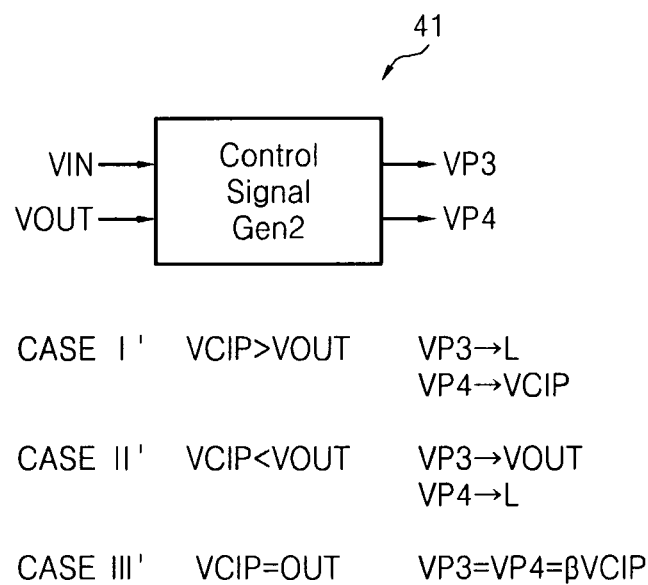
FIG. 3 shows a block diagram for explaining an operation of a second control signal generator illustrated in FIG. 1.

FIG. 3 shows a block diagram for explaining an operation of the second control signal generator illustrated in FIG. 1. Referring to FIGS. 1 and 3, the second control signal generator 41 outputs the third control signal VP3 having a low level and the fourth control signal VP4 having the voltage VCIP of a second input terminal N3 when the voltage VCIP of the second input terminal N3 is higher than a voltage VOUT of the second output terminal N4 (CASE I').

The third switching transistor 43 controls a connection between the second input terminal N3 and the second bulk terminal BULK2 in response to the third control signal VP3, and the fourth switching transistor 45 controls connection between the second output terminal N4 and the second bulk terminal BULK2 in response to the fourth control signal VP4. According to an example embodiment, the third switching transistor 43 and the fourth switching transistor 43 may be embodied as a PMOS transistor. Accordingly, when the third control signal VP3 is a low level, the third switching transistor 43 is turned on, so that the second input terminal N3 and the second bulk terminal BULK2 are connected each other.

When a fourth control signal VP4 is the voltage VCIP of the second input terminal N3, the fourth switching transistor 45 is turned-off, so that the second output terminal N4 and the second bulk terminal BULK2 are not connected each other.

The second control signal generator 41, when a voltage VOUT of a second output terminal N4 is higher than the voltage VCIP of the second input terminal N3, outputs the third control signal VP3 having the voltage VOUT of the second output terminal N4 and the fourth control signal VP4 having a low level. Accordingly, when the third control signal VP3 is the voltage VOUT of the second output terminal N4, the third switching transistor 23 is turned-off, so that the second input terminal N3 and the second bulk terminal BULK2 are not connected each other. When the fourth control signal VP4 is a low level, the fourth switching transistor 45 is turned-on, so that the second output terminal N4 and the second bulk terminal BULK2 are connected each other (CASE II').

The second control signal generator 41, when the voltage VOUT of the second output terminal N4 and the voltage VCIP of the second input terminal N3 are the same (CASE outputs a third control signal VP3 and a fourth control signal VP4, which have a voltage βVCIP having a second middle level respectively. For example, β may be smaller than 1.

When the third control signal VP3 is the voltage βVCIP, the voltage βVCIP turns on the third switching transistor 43, so that the second input terminal N3 and the second bulk terminal BULK2 are connected each other. When the fourth control signal VP4 is the voltage βVCIP, the voltage βVCIP turns on the fourth switching transistor 45, so that the second output terminal N4 and the second bulk terminal BULK2 are connected each other.

When the third control signal VP3 and the fourth control signal VP4 have the second middle level respectively, the third switching transistor 43 and the fourth switching transistor 45 are turned on, so that the second bulk terminal BULK2 is not floated but connected to the second input terminal N3 and the second output terminal N4. For example, the second capacitor 47 may be charged by two times the input voltage VIN according to each operation of the first transistor 11, the second switching circuit 15 and the second transistor 31.

Figure 4:
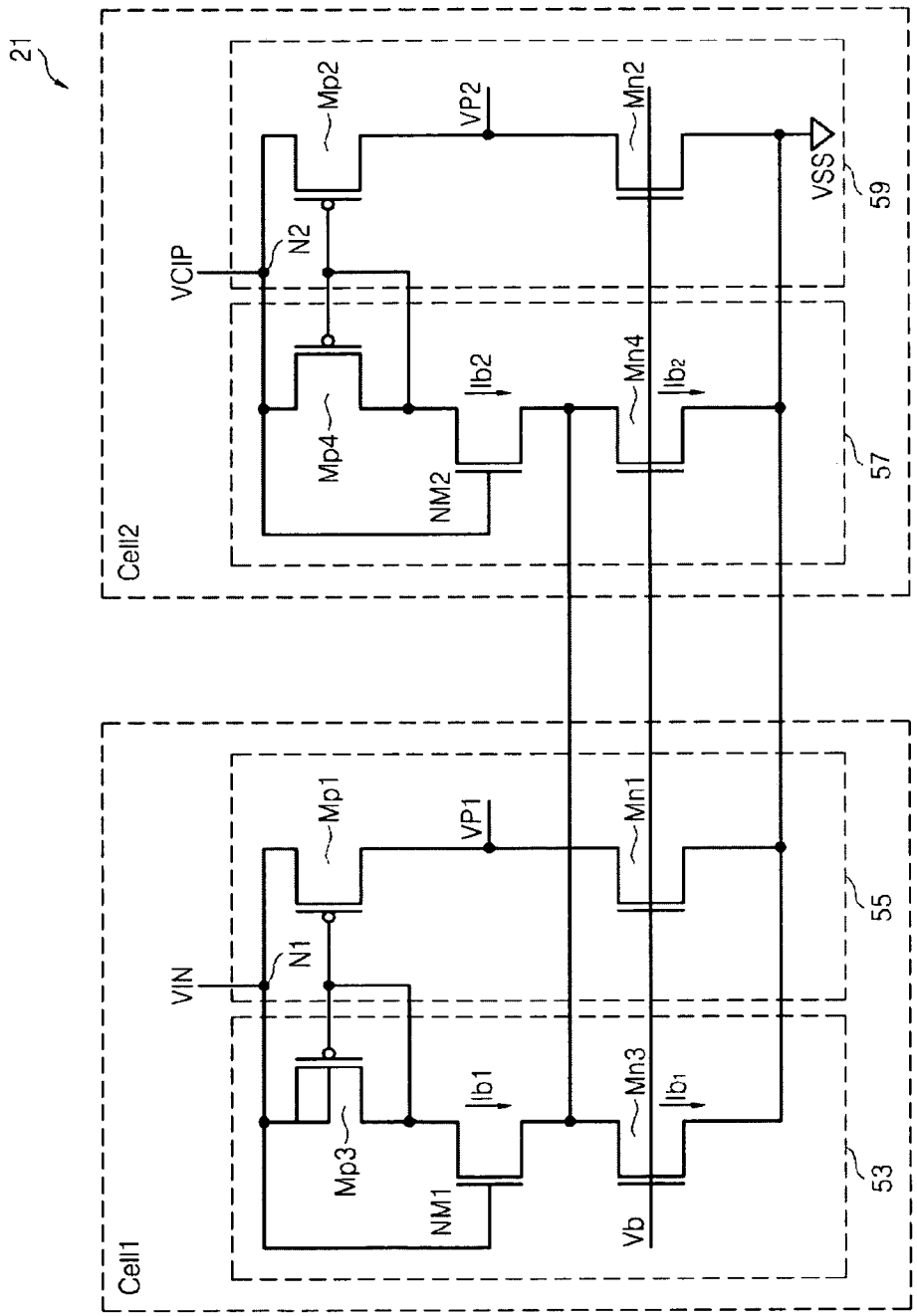
FIG. 4 shows a circuit diagram of the first control signal generator illustrated in FIG. 1.

FIG. 4 shows a circuit diagram of a first control signal generator illustrated in FIG. 1. A structure of the first control signal generator 21 is substantially the same as a structure of a second control signal generator 41, therefore, only the first control signal generator 21 is illustrated in FIG. 4 for the sake of brevity.

Referring to FIGS. 1, 2 and 4, the first control signal generator 21 includes a first cell cell1 and a second cell cell2. The first cell cell1 includes a first branch 53 and a second branch 55. The first branch 53 converts a voltage VIN (VCIP in the second control signal generator 41) of the first input terminal N1 to a first cell current Ib1. The second branch 55 converts the first cell current Ib1 to the first control signal VP1 (the third control signal VP3 in the second control signal generator 41).

The first branch 53 includes a third PMOS transistor Mp3 connected in series between the first input terminal N1 and a ground VSS, a first input transistor NM1 and a third NMOS transistor Mn3. A drain terminal and a gate terminal of the third PMOS transistor Mp3, are connected each other. A gate terminal of the first input transistor NM1 is connected to the first input terminal N1. A gate terminal of the third NMOS transistor Mn3 receives a bias voltage Vb.

The second branch 55 includes a first PMOS transistor Mp1 connected in series between the first input terminal N1 and a first NMOS transistor Mn1. A gate terminal of the first PMOS transistor Mp1 is connected to a gate terminal of the third PMOS transistor Mp3. A gate terminal of the first NMOS transistor Mn1 receives the bias voltage Vb.

The second cell cell2 includes a third branch 57 and a fourth branch 59. The third branch 57 converts the voltage VCIP (the voltage VOUT for the second control signal generator 41) of the first output terminal N2 to a second cell current Ib2. The fourth branch 59 converts the second cell current Ib2 to the second control signal VP2 (the fourth control signal VP4 for the second control signal generator 41). The third branch 57 includes the first output terminal N2, a fourth PMOS transistor Mp4, the ground VSS, a second input transistor NM2 and a fourth NMOS transistor Mn4 connected in series.

A drain terminal and a gate terminal of the fourth PMOS transistor Mp4 are connected to each other. A gate terminal of the second input transistor NM2 is connected to the first output terminal N2. A gate terminal of the fourth NMOS transistor Mn4 receives the bias voltage Vb.

The fourth branch 59 includes a second PMOS transistor Mp2, the first output terminal N2, the ground VSS and a second NMPS transistor Mn2 connected in series. A gate terminal of the second PMOS transistor Mp2 is connected to a gate terminal of the fourth PMOS transistor Mp4. A gate terminal of the second NMOS transistor Mn2 receives the bias voltage Vb.

When the first input transistor NM1 and the second input transistor NM2 operate in a saturation region, respectively, the first cell current Ib1 becomes related to a square of the voltage VIN of the first input terminal N1 and the second cell current Ib2 becomes related to a square of the voltage VCIP of the first output terminal N2. When the first input transistor NM1 and the second input transistor NM2 operate in a cut-off region, respectively, each cell current Ib1 and Ib2 and each voltage VIN and VCIP may be exponential.

When the voltage VIN of the first input terminal N1 is higher than the voltage VCIP of the first output terminal N2 (CASE I), the first cell current Ib1 may be a current 2Ib corresponding to the sum of a bias current Ib1 of the first cell cell1 and a bias current Ib2 of the second cell cell2, and a current Ib2 of the second cell current cell2 may be 0.

The first cell current Ib1 is copied to the second branch 55 and converted to generate the first control signal VP1. Since a copied current 2Ib is larger than the bias current Ib1, the first control signal VP1 has a level of the voltage VIN of the first input terminal N1 and the second control signal VP2 has a low level.

When the voltage VCIP of the first output terminal N2 is higher than the voltage VIN of the first input terminal N1 (CASE II), the second cell current Ib2 becomes the current 2Ib corresponding to the sum of the bias current $Ib_1$ of the first cell cell1 and the bias current $Ib_2$ of the second cell, and a current Ib1 of the first cell may be 0.

The second cell current Ib2 is copied to the fourth branch 59 and is converted to operate the second control signal VP2. Since a copied current 2Ib is larger than the bias current $Ib_2$, the second control signal VP2 has a level of the voltage VCIP of the first output terminal and the first control signal VP1 has a low level.

When the voltage VCIP of the first output terminal N2 and the voltage VIN of the first input terminal N1 are the same (CASE III), the first cell current Ib1 and the second cell current Ib2 are the same as the bias current $Ib_1$ and $Ib_2$, respectively.

The first cell current Ib1 is copied to the second branch 55 and the second cell current Ib2 is copied to the fourth branch 59. Since the transistors Mp1 and Mn1 of the second branch 55 and the transistors Mp2 and Mn2 of the fourth branch 59 operate in a saturation region, the first control signal VP1 and the second control signal VP2 have a voltage of a first middle level αVIN, respectively.

Figure 5:
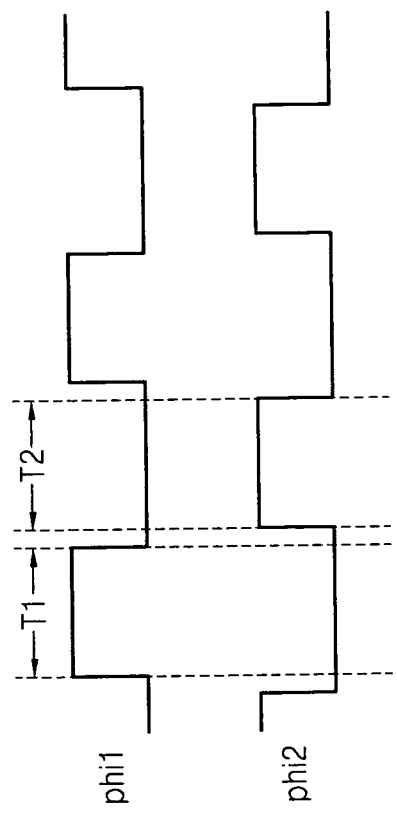
FIG. 5 is a timing diagram of a first clock signal and a second clock signal for controlling an operation of the charge pump circuit illustrated in FIG. 1.

FIG. 5 is a timing diagram of the first clock signal phi1 and the second clock signal phi2 for controlling an operation of a charge pump circuit illustrated in FIG. 1. Referring to FIGS. 1 and 5, each clock signal phi1 and /phi1 is a signal for turning on or off each transistor 11 and 15-1.

A clock signal /phi2 is a signal for turning on or off each transistor 31 and 15-3. Each clock signal phi1 and phi2 is a non-overlap clock signal and each clock signal /phi1 and /phi2 is a non-overlap clock signal. Here, "/" means inversion.

A charge pump circuit 10 boosts the input voltage VIN by performing a step of charging (T1) and a step of discharging (T2) repetitively according to the first clock signal phi1 and the second clock signal phi2, and transmits the boosted voltage VCIP to the second output terminal N4.

During a step of charging (T1), the fifth switching transistor 15-1 is turned on in response to the first clock signal phi1, a first transistor 11 is turned on in response to an inverted first clock signal /phi1, and each transistor 31 and 15-3 is turned off in response to the inverted second clock signal /phi2. Accordingly, the first capacitor 13 is connected between the first input terminal N1 and the ground VSS and is charged.

During a step of discharging (T2), the fifth switching transistor 15-1 is turned off in response to the first clock signal phi1, the first transistor 11 is turned off in response to the inverted first clock signal /phi1, and each transistor 31 and 15-3 is turned on in response to the inverted second clock signal /phi2. Accordingly, the first capacitor 13 is connected between the first input terminal N1 and the second output terminal N4 and is discharged.

Figure 6:
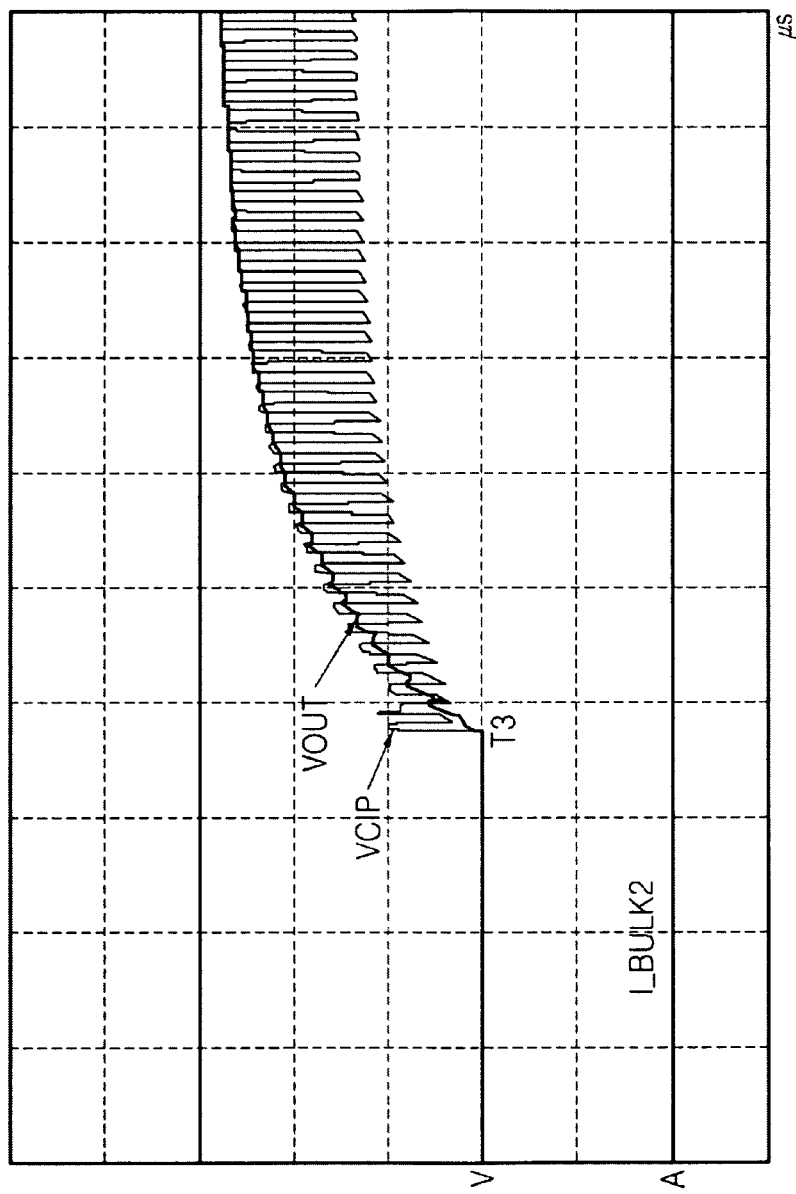
FIG. 6 is a timing diagram of signals for explaining an operation of the charge pump circuit illustrated in FIG. 1.

FIG. 6 is a timing diagram of signals for explaining an operation of the charge pump circuit illustrated in FIG. 1. Referring to FIGS. 1 and 6, an input voltage VIN, a first clock signal phi1 and a second clock signal phi2 are supplied to a charge pump circuit 10 at a time point of T3.

The voltage VCIP of the first output terminal N2 is charged or discharged as the charge pump circuit 10 performs a step of charging (T1) and a step of discharging (T2) by turn in response to the first clock signal phi1 and the second clock signal phi2. The voltage VOUT of the second output terminal N4 is lower than the voltage VCIP of the first output terminal N2 at a beginning of boosting. At a step of charging (T1), the voltage VCIP of the first output terminal N2 is higher than the voltage VOUT of the second output terminal N4, and the voltage VOUT of the second output terminal N4 is higher than the voltage VCIP of the first output terminal N2 at a step of discharging (T2).

The third switching circuit 40 connects the second bulk terminal BULK2 to one of the second input terminal N3 and the second output terminal N4, which has a higher voltage, according to the voltage VCIP of the second input terminal N3 and the voltage VOUT of the second output terminal N4. As the second bulk terminal BULK2 is connected to one of the voltage VCIP of the second input terminal N3 and the voltage VOUT of the second output terminal N4, which has a higher voltage, a current I_BULK2 of the second bulk terminal BULK2 is not occurred. Accordingly, the charge pump circuit 10 may prevent latch-up.

Figure 7:
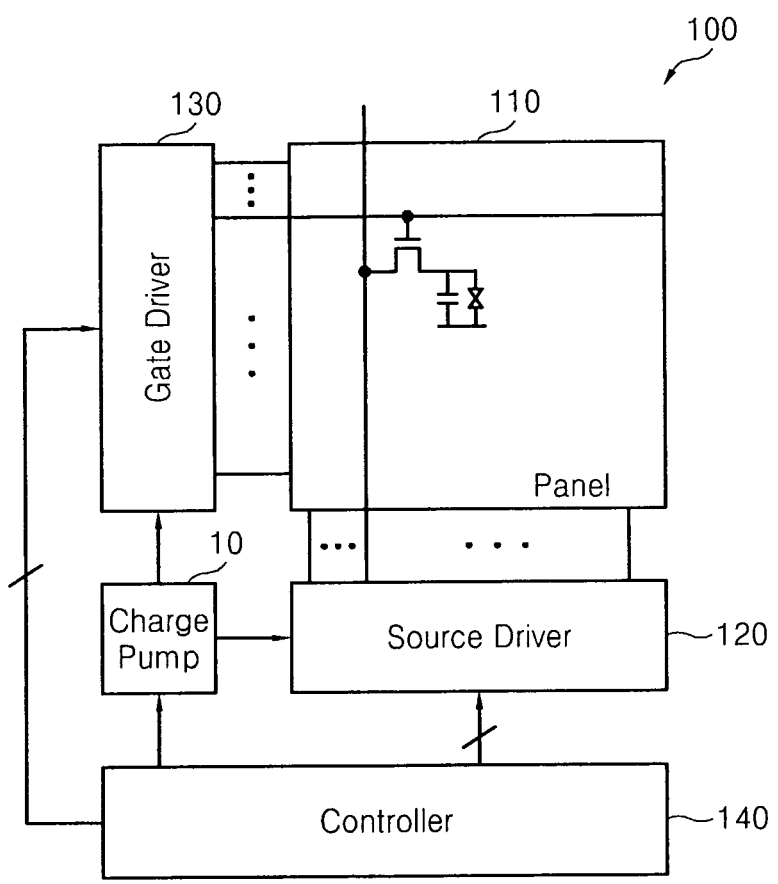
FIG. 7 shows a block diagram according to an example embodiment of a display device including the charge pump circuit illustrated in FIG. 1.

FIG. 7 shows a block diagram showing an example embodiment of a display device including the charge pump circuit illustrated in FIG. 1. Referring to FIG. 7, a display device 100 includes a panel 110, a source driver 120, a gate driver 130, the charge pump circuit 10 and a controller 140.

The panel 110 may include a plurality of data lines, a plurality of gate lines, and a plurality of pixels formed at a cross point of the plurality of data lines and the plurality of gate lines. The plurality of pixels may be turned on/off by each transistor and on/off of the transistor may be controlled by the gate driver 130.

The source driver 120 outputs an analog voltage to drive a plurality of data lines or source lines embodied at the panel 110 in response to control signals, output from the controller 140, and a voltage, output from the charge pump circuit 10. The gate driver 130 drives successively a plurality of gate lines or scan lines embodied in the panel 110 so that the analog voltage output from a source driver 120 may be supplied to each pixel in response to control signals output from the controller 140 and a voltage output from the charge pump circuit 10.

The charge pump circuit 10 explained referring to FIGS. 1 to 6 may supply a boosted voltage VOUT to the source driver 120 or the gate driver 130 in response to a plurality of control signals output from the controller 140, e.g., control signals illustrated in FIG. 1. The controller 140 may generate a plurality of timing control signals capable of controlling operations of the source driver 120 and the gate driver 130.

A charge pump circuit according to example embodiments and apparatuses including the charge pump circuit may prevent latch-up.

Although few example embodiments of inventive concepts have been shown and described, it will be appreciated by those skilled in the art that changes may be made in these example embodiments without departing from the principles and spirit of the inventive concepts, the scope of which is defined in the appended claims and their equivalents.

What is claimed is:

1. A charge pump circuit comprising:
 a first transistor including a first bulk terminal, a first input terminal and a first output terminal;
 a first switching circuit configured to connect the first bulk terminal to one of the first input terminal and the first output terminal based on a voltage of the first input terminal and a voltage of the first output terminal, the first switching circuit including,
  a first control signal generator configured to (1) output a first control signal having a low level voltage and a second control signal having the voltage of the first input terminal if the voltage of the first input terminal is higher than the voltage of the first output terminal, and (2) output the first control signal having the voltage of the first output terminal and the second control signal having the low level voltage if the voltage of the first output terminal is higher than the voltage of the first input terminal,
  a first switching transistor configured to connect the first input terminal and the first bulk terminal in response to the first control signal, and
  a second switching transistor configured to connect the first output terminal and the first bulk terminal in response to the second control signal, a first bulk of the first switching transistor and a second bulk of the second switching transistor being connected to the first bulk terminal;
 a first capacitor having a first terminal connected to the first output terminal; and
 a second switching circuit configured to connect a second terminal of the first capacitor to the first input terminal or a ground in response to a plurality of clock signals.

2. The charge pump circuit of claim 1, wherein the first control signal generator is configured to output the first control signal and the second control signal having a first middle level voltage if the voltage of the first input terminal and the voltage of the first output terminal are the same.

3. The charge pump circuit of claim 1, further comprising:
 a second transistor including a second bulk terminal, a second input terminal connected to the first output terminal and a second output terminal configured to output an output voltage;
 a third switching circuit configured to connect the second bulk terminal to one of the second input terminal and the second output terminal based on a voltage of the second input terminal and a voltage of the second output terminal; and
 a second capacitor connected between the second output terminal and the ground.

4. The charge pump circuit of claim 3, wherein the third switching circuit comprises:
 a second control signal generator configured to (1) output a third control signal having a low level voltage and a fourth control signal having the voltage of the second input terminal if the voltage of the second input terminal is higher than the voltage of the second output terminal, and (2) output the third control signal having the voltage of the second output terminal and the fourth control signal having the low level voltage if the voltage of the second output terminal is higher than the voltage of the second input terminal;
 a third switching transistor configured to connect the second input terminal and the second bulk terminal in response to the third control signal; and
 a fourth switching transistor configured to connect the second output terminal and the second bulk terminal in response to the fourth control signal,
 wherein a third bulk of the third switching transistor and a fourth bulk of the fourth switching transistor are connected to the second bulk terminal.

5. The charge pump circuit of claim 4, wherein the second control signal generator is configured to output the third control signal and the fourth control signal having a second middle level voltage if the voltage of the second input terminal and the voltage of the second output terminal are the same.

6. A driver comprising:
 a charge pump circuit; and
 a gate driver configured to output an output voltage output from the charge pump circuit to a gate line,
 wherein the charge pump circuit includes,
  a first transistor including a first bulk terminal, a first input terminal and a first output terminal,
  a first switching circuit configured to connect the first bulk terminal to one of the first input terminal and the first output terminal based on a voltage of the first input terminal and a voltage of the first output terminal, the first switching circuit including,
   a first control signal generator configured to (1) output a first control signal having a low level voltage and a second control signal having the voltage of the first input terminal if the voltage of the first input terminal is higher than the voltage of the first output terminal, and (2) output the first control signal having the voltage of the first output terminal and the second control signal having the low level voltage if the voltage of the first output terminal is higher than the voltage of the first input terminal,
a first switching transistor configured to connect the first input terminal and the first bulk terminal in response to the first control signal, and
a second switching transistor configured to connect the first output terminal and the first bulk terminal in response to the second control signal, a first bulk of the first switching transistor and a second bulk of the second switching transistor being connected to the first bulk terminal,
a first capacitor having a first terminal connected to the first output terminal,
a second switching circuit configured to connect a second terminal of the first capacitor to the first input terminal or a ground in response to a plurality of clock signals,
a second transistor including a second bulk terminal, a second input terminal connected to the first output terminal, and a second output terminal configured to output the output voltage,
a third switching circuit configured to connect the second bulk terminal to one of the second input terminal and the second output terminal based on a voltage of the second input terminal and a voltage of the second output terminal, and
a second capacitor connected between the second output terminal and the ground.

7. The driver of claim 6, wherein the first control signal generator is configured to output the first control signal and the second control signal, which have a first middle level voltage if the voltage of the first input terminal and the voltage of the first output terminal are the same.

8. The driver of claim 6, wherein the third switching circuit comprises:
a second control signal generator configured to (1) output a third control signal having a low level voltage and a fourth control signal having the voltage of the second input terminal if the voltage of the second input terminal is higher than the voltage of the second output terminal, and (2) output the third control signal having the voltage of the second output terminal and the fourth control signal having the low level voltage if the voltage of the second output terminal is higher than the voltage of the second input terminal;
a third switching transistor configured to connect the second input terminal and the second bulk terminal in response to the third control signal; and
a fourth switching transistor configured to connect the second output terminal and the second bulk terminal in response to the fourth control signal,
wherein a third bulk of the third switching transistor and a fourth bulk of the fourth switching transistor are connected to the second bulk terminal.

9. The driver of claim 8, wherein the second control signal generator is configured to output the third control signal and the fourth control signal, which have a second middle level voltage if the voltage of the second input terminal and the voltage of the second output terminal are the same.

10. A display device comprising:
a panel including a plurality of gate lines;
a driver for driving one of the plurality of gate lines; and
a charge pump circuit coupled to the driver, the charge pump circuit including,
a first transistor including a first bulk terminal, a first input terminal and a first output terminal,
a first switching circuit configured to connect the first bulk terminal to one of the first input terminal and the first output terminal based on a voltage of the first input terminal and a voltage of the first output terminal,
a first capacitor having a first terminal connected to the first output terminal,
a second switching circuit configured to connect a second terminal of the first capacitor to the first input terminal or a ground in response to a plurality of clock signals,
a second transistor including a second bulk terminal, a second input terminal connected to the first output terminal, and a second output terminal configured to output the output voltage,
a third switching circuit configured to connect the second bulk terminal to one of the second input terminal and the second output terminal based on a voltage of the second input terminal and a voltage of the second output terminal, the third switching circuit including,
a second control signal generator configured to (1) output a third control signal having a low level voltage and a fourth control signal having the voltage of the second input terminal if the voltage of the second input terminal is higher than the voltage of the second output terminal, and (2) output the third control signal having the voltage of the second output terminal and the fourth control signal having the low level voltage if the voltage of the second output terminal is higher than the voltage of the second input terminal,
a third switching transistor configured to connect the second input terminal and the second bulk terminal in response to the third control signal, and
a fourth switching transistor configured to connect the second output terminal and the second bulk terminal in response to the fourth control signal, a third bulk of the third switching transistor and a fourth bulk of the fourth switching transistor being connected to the second bulk terminal, and
a second capacitor connected between the second output terminal and the ground.

11. The display device of claim 10, wherein the first switching circuit comprises:
a first control signal generator configured to (1) output a first control signal having a low level voltage and a second control signal having the voltage of the first input terminal if the voltage of the first input terminal is higher than the voltage of the first output terminal, and (2) output the first control signal having the voltage of the first output terminal and the second control signal having the low level voltage if the voltage of the first output terminal is higher than the voltage of the first input terminal;
a first switching transistor configured to connect the first input terminal and the first bulk terminal in response to the first control signal; and
a second switching transistor configured to connect the first output terminal and the first bulk terminal in response to the second control signal,
wherein a first bulk of the first switching transistor and a second bulk of the second switching transistor are connected to the first bulk terminal.

* * * * *